United States Patent
Davison (10) Patent No.: US 8,738,443 B2
(45) Date of Patent: May 27, 2014

(54) SYSTEM AND METHOD FOR ADVERTISING USING PUSHED VIDEO

(76) Inventor: George M. Davison, Pittsburgh, PA (US)

(*) Notice: Subject to any disclaimer, the term of this patent is extended or adjusted under 35 U.S.C. 154(b) by 467 days.

(21) Appl. No.: 12/782,051

(22) Filed: May 18, 2010

(65) Prior Publication Data

US 2010/0293059 A1 Nov. 18, 2010

Related U.S. Application Data

(60) Provisional application No. 61/179,035, filed on May 18, 2009.

(51) Int. Cl.
*G06Q 30/00* (2012.01)

(52) U.S. Cl.
USPC .................................................. 705/14.69

(58) Field of Classification Search
USPC .......................................................... 705/14
See application file for complete search history.

(56) References Cited

U.S. PATENT DOCUMENTS

| | | | |
|---|---|---|---|
| 6,014,689 A * | 1/2000 | Budge et al. .................. | 709/206 |
| 6,836,792 B1 | 12/2004 | Chen | |
| 7,401,122 B2 | 7/2008 | Chen | |
| 8,225,342 B2 * | 7/2012 | Mears et al. ........................ | 725/9 |
| 2001/0032246 A1 * | 10/2001 | Fardella et al. ............... | 709/206 |
| 2001/0051517 A1 | 12/2001 | Strietzel | |
| 2002/0026360 A1 * | 2/2002 | McGregor et al. .............. | 705/14 |
| 2002/0087631 A1 | 7/2002 | Sharma | |
| 2002/0129089 A1 * | 9/2002 | Hegde et al. ................... | 709/200 |
| 2002/0180788 A1 * | 12/2002 | Wu ................................ | 345/752 |
| 2003/0093315 A1 * | 5/2003 | Sato ................................. | 705/14 |
| 2004/0043810 A1 * | 3/2004 | Perlin et al. ..................... | 463/16 |
| 2004/0133467 A1 | 7/2004 | Siler | |
| 2004/0249709 A1 | 12/2004 | Donovan et al. | |
| 2005/0033855 A1 * | 2/2005 | Moradi et al. ................ | 709/231 |
| 2005/0086316 A1 | 4/2005 | Chen | |
| 2006/0168004 A1 | 7/2006 | Choe et al. | |
| 2007/0078835 A1 * | 4/2007 | Donnelli .......................... | 707/3 |
| 2007/0094333 A1 * | 4/2007 | Schilling et al. .............. | 709/206 |
| 2007/0143786 A1 | 6/2007 | Deitsch et al. | |
| 2007/0226053 A1 | 9/2007 | Carl et al. | |
| 2008/0010145 A1 | 1/2008 | Ou | |
| 2008/0040742 A1 | 2/2008 | Howcroft et al. | |
| 2008/0086360 A1 | 4/2008 | Kanapur | |
| 2008/0109844 A1 * | 5/2008 | Baldeschwieler et al. ...... | 725/35 |
| 2008/0176534 A1 | 7/2008 | Kim | |
| 2008/0201433 A1 | 8/2008 | McDonald | |
| 2008/0249833 A1 | 10/2008 | Ali et al. | |
| 2008/0275762 A1 * | 11/2008 | Cutler et al. ................... | 705/10 |
| 2009/0006191 A1 | 1/2009 | Arankalie et al. | |
| 2009/0006208 A1 | 1/2009 | Grewal et al. | |
| 2009/0018917 A1 | 1/2009 | Chapman | |
| 2009/0029721 A1 | 1/2009 | Doraswamy | |

(Continued)

*Primary Examiner* — Matthew L Hamilton
(74) *Attorney, Agent, or Firm* — K&L Gates LLP (57) ABSTRACT

Computer-based systems and methods for advertising by pushing video to recipients. The subject matter of the videos may be targeted to the affinities of the recipients. The videos embedded in the emails may comprise a short commercial that the recipients view when viewing the video. A computerized host data center may track the recipients' interaction with the video. Advertisers may be charged advertising rates based on the recipients' interactions with the video email. The video may be continually pushed to various recipients. The recipients may watch the videos when it is convenient for them simply by opening, for example, an email that included the video in various embodiments.

13 Claims, 3 Drawing Sheets

(56) References Cited

U.S. PATENT DOCUMENTS

| | | | |
|---|---|---|---|
| 2009/0049495 A1* | 2/2009 | Ketterling et al. | 725/112 |
| 2009/0070704 A1 | 3/2009 | Ording | |
| 2009/0172727 A1 | 7/2009 | Baluja et al. | |
| 2009/0228346 A1 | 9/2009 | Hu et al. | |
| 2009/0271268 A1 | 10/2009 | Zhao et al. | |
| 2011/0037767 A1* | 2/2011 | Casanova et al. | 345/473 |
| 2011/0047223 A1* | 2/2011 | Naftali-Menajed | 709/206 |
| 2011/0066730 A1* | 3/2011 | Julia et al. | 709/226 |
| 2011/0264751 A1* | 10/2011 | Jans | 709/206 |
| 2013/0036203 A1* | 2/2013 | Liwerant et al. | 709/219 |

* cited by examiner

SYSTEM AND METHOD FOR ADVERTISING USING PUSHED VIDEO

PRIORITY CLAIM

The present application claims priority to U.S. provisional patent application Ser. No. 61/179,035, filed May 18, 2009, which is incorporated herein by reference in its entirety.

BACKGROUND

In part due to the vast number of cable channels available to televisions viewers and to the ability of viewers to skip commercials (either through fast forwarding digitally recorded programs or channel surfing), television advertising spending is believed to be trending downward and increasingly more advertising spending is being allocated to the Internet. However, the Internet poses it own challenges for advertisers. For example, the Internet generally does not have the programming quality that television has, although the discrepancy between the quality of programming for television and for the Internet may be lessening.

SUMMARY

In one general aspect, the present invention is directed generally to computer-based systems and methods for advertising by pushing video to recipients. The video may be included in data sent electronically to the recipient via a data network. The data may be, for example, an email, a menu alert, an application alert, or some other suitable data form. The subject matter of the videos may be targeted to the affinities of the recipients. Further, the videos embedded in the data (e.g., emails) may comprise a short commercial that the recipients view when viewing the video. A computerized host data center may track the recipients' interaction with the video. For example, the host data center may track whether the recipients view the video and/or the commercial, whether the recipients click on the commercial or a link for the product/service offered in the commercial, whether the recipients access a web site associated with the advertiser for the commercial, and/or whether the recipients purchase online the product or service offered in the commercial. The advertisers may be charged advertising rates based on the recipients' interactions with the video and/or data.

The video data may be continually pushed to various recipients, thus taking entertainment content directly to the recipients in their areas of interest. The recipients may watch the videos when it is convenient for them simply by opening the data (e.g., emails) in various embodiments. Further, since the context of the videos is appealing to the recipients based on their known areas of interest, the recipients are inclined to watch the entire video, including the commercial portion. Thus, the advertisers are likely to get their commercials viewed by their targeted audience. Further, the recipients may be presented with an opportunity to subscribe to ongoing video content. Also, personalized web sites may be hosted for the recipients when the recipients can view videos pertaining to their areas of interest. The videos displayed in such a manner may similarly have commercials therein.

FIGURES

Various embodiments of the present invention are described herein by way of example in connection with following figures, wherein.

DESCRIPTION

In one general aspect, the present invention is directed generally to computer-based systems, which systems preferably include hand held devices, and methods for pushing video content to recipients. The subject matter of the videos may be targeted to the affinities of the recipients. Further, the videos may comprise a short commercial, typically in the middle of the video, that the recipients view while watching the video. The videos may be sent in emails, for example, although in other embodiments the video may be pushed in other data formats, such a menu alerts, or applications sent to the recipient's device. In general, the invention will be described herein in the context of the videos being sent by email, although it should be recognized that the invention is not so limited and that other data formats for pushing the vide may be employed.

A computerized host data center may track the recipients' interactions with the video pushed to the recipients. For example, the host data center may track whether the recipients view the video and/or the commercial, whether the recipients click on the commercial or a link for the product/service offered in the commercial, whether the recipients access a web site associated with the commercial, and/or whether the recipients purchase online the products or services offered in the commercials. This tracking information may be stored in a database of the host data center, and advertisers may be charged various advertising rates based on the recipient interaction data stored in the database.

Figure 1:
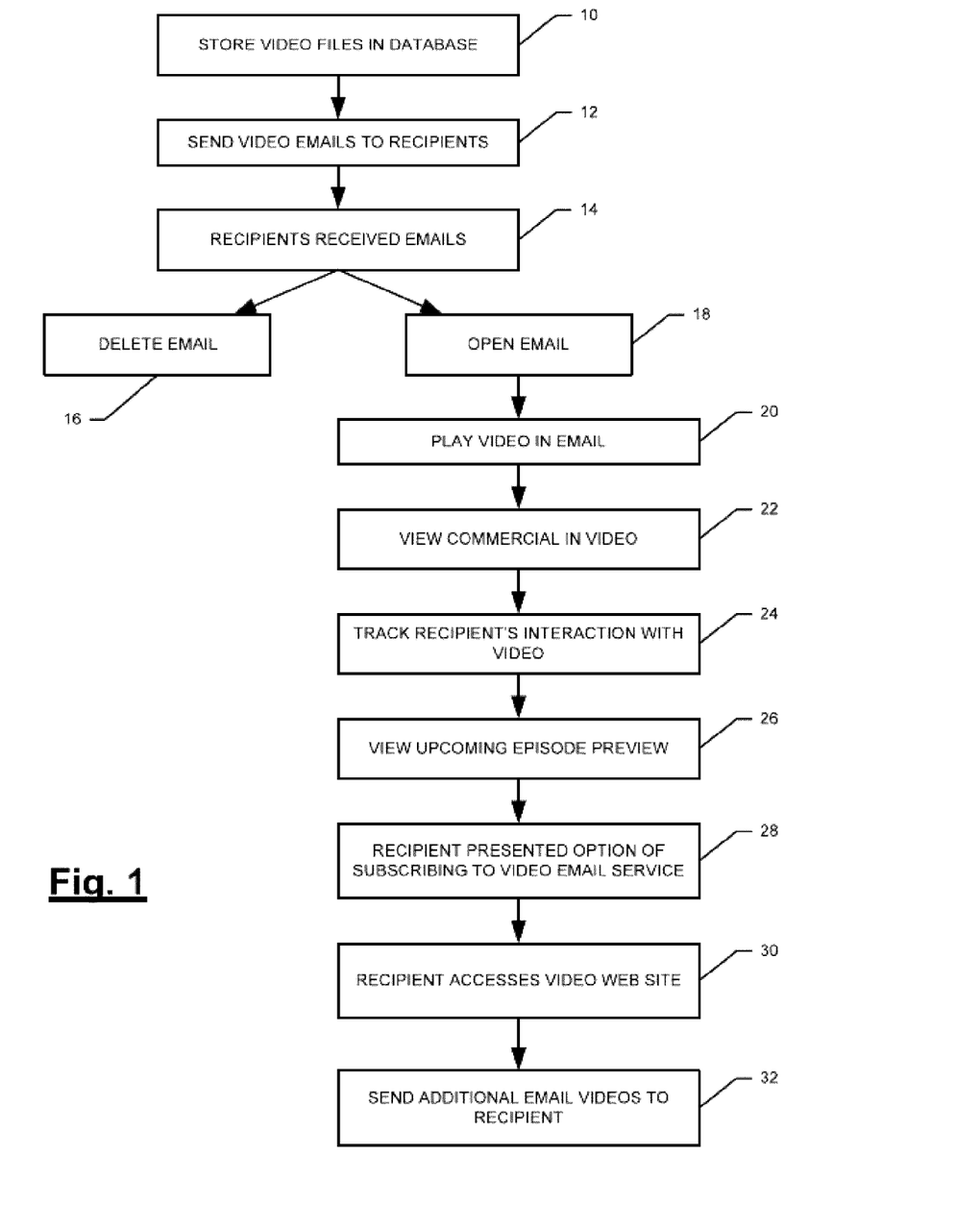
FIG. 1 is a flow chart illustrating a process according to various embodiments of the present invention.
Figure 2:
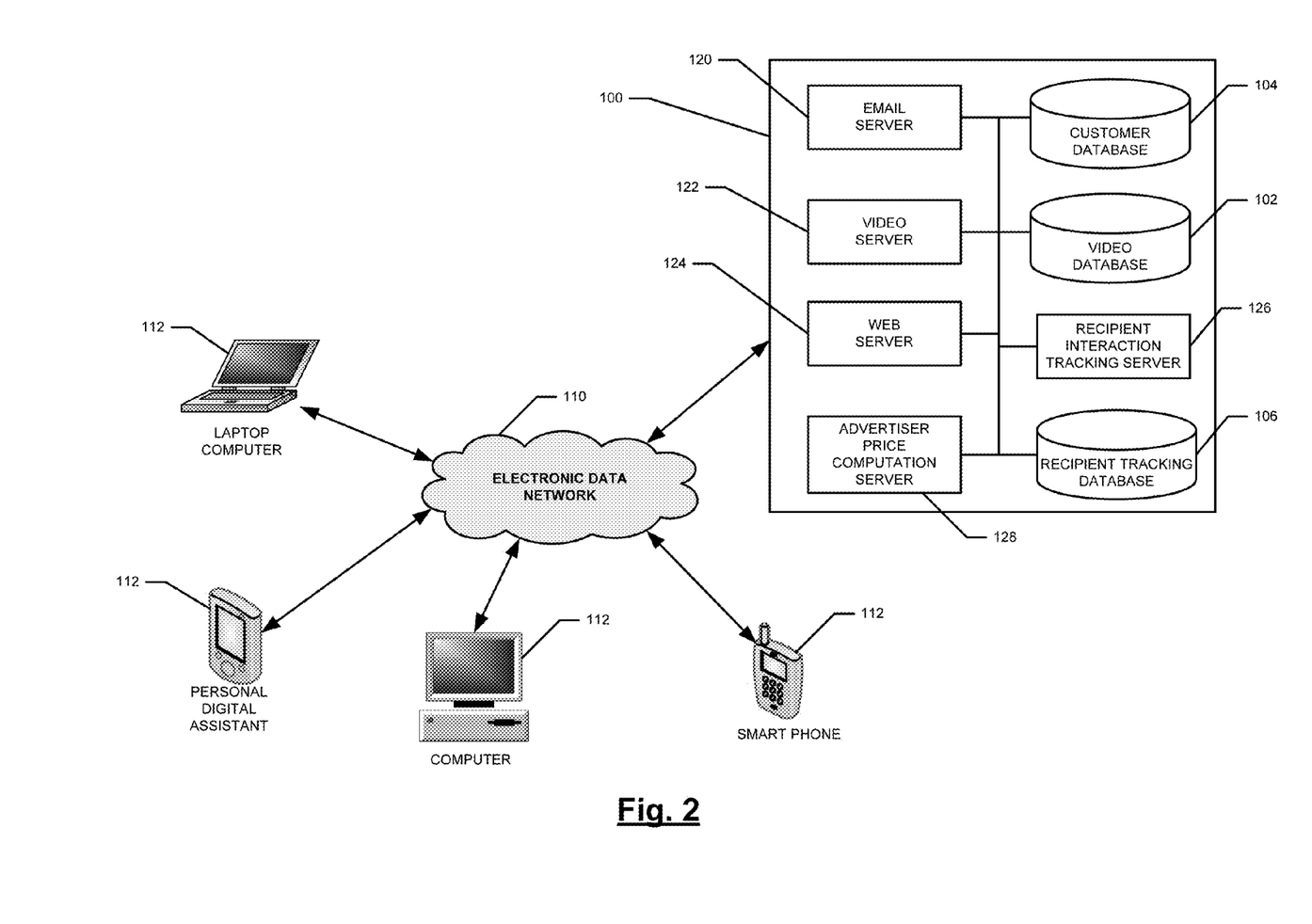
FIG. 2 is a diagram of a computer-based system according to various embodiments of the present invention.

Various embodiments of the present invention will be described in connection with FIGS. 1 and 2, where FIG. 1 is a flowchart of a process according to various embodiments of the present invention, and FIG. 2 is a diagram of a computer system according to various embodiments of the present invention. Referring to FIG. 1, at step 10, a number of videos are stored in a video database 102 (see FIG. 2). The video database 102 may be part of a computer-based host data center 100 that comprises, in addition to the video database 102, a customer database 104, and a recipient tracking database 106. The host data center 100 may comprise additional databases if desired. The data stored in the databases 102, 104, 106 may be stored in one or more non-volatile mass storage devices of the host data center 100. The mass storage devices may comprise, for example, one or more memory circuits (e.g., semiconductor or magnetic memory circuits), hard disk drive systems (e.g. RAID(s)), optical disk drive systems, etc. The files of data stored at the host data center 100, e.g., the video files stored in the video database 102, etc., may be organized according to a file system. The data center 100 may comprise one or more database manager systems (DMBS) (not shown) to control the organization, storage, management, and retrieval of data in the computer databases 102-106. The data center 100 may additionally employ a SAN (storage access network) to connect the various databases (e.g., databases 102, 104, 106) to the servers of the host center 100.

The video files stored in the database 102 may be digital video formatted in any format suitable for transmission via an electronic data network 110 (see FIG. 2) to recipient end user devices (also sometimes referred to herein as "recipient client devices") 112. For example, the videos may be formatted using the MPEG, AVI, RealVideo, and/or QuickTime formats, or any other suitable digital video format. The network 110 may be any suitable type of electronic data communication network for transmitting video emails, and may comprise a number of computer and/or data networks, including the Internet, LANs, WANs, GPRS networks, etc., utilizing wired and/or wireless communication links. The recipient end user devices 112 may be any type of processor-based communication device capable of accessing the network 110 and playing the videos transmitted by the host data center 100. For example, the recipient end user devices 112 may comprise a personal computer, a laptop computer, a smart phone, a personal digital assistant, etc., or any other suitable network-enabled, multimedia processor-based device. The recipient end user devices 112 preferably comprise an email program and/or a web browser for accessing a web-based email program. The recipient end user devices 112 also preferably comprise a software program for playing the videos sent in the email from the host data center 100, such as QuickTime, RealPlayer, Windows Media Player, or any other suitable digital video player.

The videos clips stored in the video database 102 may be of any length, but are preferably relatively short, such as three (3) to five (5) minutes in duration. The videos may pertain to a variety of different topics. For example, the videos may pertain to topics that are of interest to recipients 112 that are targeted for advertising using the push video emails sent from the host data center 100. For example, the videos may pertain to topics such as fishing, hunting, sports, cooking, investing, wine tasting, sewing, or any other suitable topic for which a target audience of recipients 112 might have an affinity.

Figure 3:
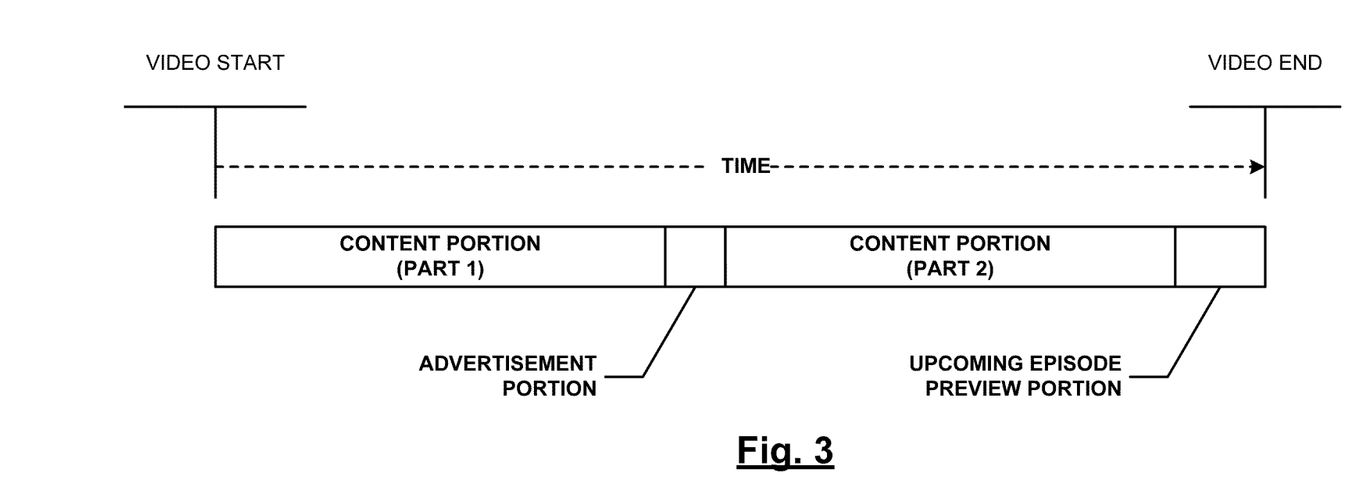
FIG. 3 is a diagram illustrating sequencing of portions of the video according to various embodiments of the present invention.

The videos may comprise a content portion, at least one commercial portion, and an upcoming episode preview portion. The content portion may contain video about the subject matter topic of the video. The commercial portion may be an advertisement for a product or service from an advertiser. The commercial portion may be relatively short compared to the overall length of the content portion. For example, for a three to five minute video, the commercial portion may be about ten seconds in duration. Also, the commercial may be inserted somewhere in the middle of the content portion so that, in such embodiments, the commercial is not played prior to the beginning of the content portion. For example, as shown in the example of FIG. 3, the commercial may be inserted about half-way through the content portion or at some other time after the beginning and prior to the conclusion of the content portion. For example, if the content portion is three minutes in length, the commercial may be inserted at the 1.5 minute mark of the content portion or at some other time other than before the beginning of content portion. The upcoming episode preview may be placed at the end of the content portion and may preview upcoming videos that the recipients may choose to view and that are enticing to the recipients.

Referring to FIG. 1, at step 12, an email (or other message data format) may be sent to one or more recipients 112 from the host data center 100 via the network 110 containing a video from the video database 102. The host data center 100 may comprise one or more email servers 120 for sending the emails to the recipients 112 via the network 110. Data regarding the recipients may be stored in the customer database 104. The customer database 104 may store data regarding recipients 112, including the names of recipients, their associated email addresses, demographic information, and one or more affinities of the recipients 112. The subject matter of the videos sent to the recipients may correspond to or be otherwise based on the affinity data for the recipient stored in the customer database 104. For example, recipients having a known affinity for fishing may be sent emails with a video about a fishing-related topic. Similarly, recipients known to have an affinity for cooking may be emailed a video with a cooking-related topic. The affinities of the recipients may be known based on their magazine subscriptions or other affinity data. In various embodiments, a bulk email may be sent by the email server 120 to many recipients 112 having a common affinity.

In various embodiments, the recipients 112 may download executable software applications, such as web applications, from the host data center 100 or another server site to their local devices 112. Such web applications may allows the recipients to identify their affinities used in determining the subject matter content of the videos pushed to the recipients 112. The recipients' affinity data may be stored in the customer database 104. Using the application(s), the recipients may set other preferences for the video email service, such as scheduling preferred times for receiving the video emails, etc., in effect creating a personalized menu that will respond to their preferences and alert them to new opportunities in their preferred service areas.

In various embodiments, the emails may comprise streaming digital video that is viewable in the email by the recipients 112. The emails may use the HTML format and call the appropriate media viewer program on the recipients' end user device 112 to play the video when the recipients open the email sent by the host data center 100. The video may be streamed from a video server 122 of the host data center 100. In various embodiments, the video server 122 may be a HTTP-based web server or a RTSP-based streaming video server.

In other embodiments, the email may comprise a link to the video server 122 that, when activated by the email recipient, opens the web browser of the recipient's end user device 112 and connects to the video server 122 for viewing of the streaming video in the recipient's video player program. In yet other embodiments, the video file may be sent as an attachment to the email.

In various embodiments, the video may comprise one or more hyperlinks embedded in the video such that when the viewer/recipient clicks on the video while it is playing, such as on the commercial portion when it is playing, the playing of the video will be paused and the viewer/recipient's end user device 112 may be directed to a network resource for additional content. The network resource may be, for example, a web site hosted by a web server 124 of the data center 100 or hosted by some other server. For example, in one embodiment, the commercial portion of the video may comprise an embedded link such that when the viewer/recipient clicks on the video during the commercial portion, the recipient's web browser opens (if not already opened) and accesses a web site with more information about the product/service that is the subject of the commercial in the video. For example, the web site may play a longer video regarding the product/service that is the subject of the commercial in the video and/or may provide additional details about the product/service. In addition or alternatively, the email may comprise, in addition to the video, a hyperlink to a web site with more content about the product/service that is the subject of the commercial in the video.

Referring back to FIG. 1, at step 14 the recipient(s) 112 may receive the email containing the video from the host data center 100. From there, the recipient may do any of the normal operations associated with a new mail message, including deleting the email without viewing the video at step 16, or opening the email at step 18 and viewing the video at step 20. As mentioned before, the video may be a streaming video that is played in the email when the recipient opens the email. Also, the email may comprise a hyperlink that, when activated by the recipient, opens the recipient's web browser and accesses a web site (such as a web site hosted by the video server 122) that streams the video to the recipient to view in the recipient's video player.

During the playing of the video, at step 22, the commercial portion of the video may be viewed by the viewer/recipient. As mentioned before, the commercial portion of the video may be relatively short, such as about 10 seconds in length. Also, the commercial portion may be played in the middle of the content portion of the video. In various embodiments, a countdown clock may also be visible during the playing of the commercial portion so that the recipient can easily see the remaining time on the commercial and know that the content portion of the video will resume momentarily following the commercial portion.

At step 24, the recipient's interaction with the video may be monitored by the host data center 100, with the monitoring data being stored in the recipient tracking database 106. The recipient tracking data may be used to charge advertisers for the commercials in the videos. For example, the email may be an HTML-formatted email that references a file or image on a server (e.g., a web server), such as recipient tracking server 126 or some other server) of the data center 100. When the recipient opens the email and accesses the server (e.g., recipient tracking server 126) for the referenced file or image, the fact that the recipient opened the email may be stored in the recipient tracking database 106. The advertiser placing the commercial in the video may be charged a fee, computed by a computer device of the data center 100 (such as advertising billing server 128 or some other computing device of the data center 100), each time a recipient opens an email with a video having a commercial by the advertiser. In various embodiments, if the recipient deletes the video email without opening the email and without viewing the video, the advertiser is not charged for the commercial. The advertising fee computed by the host data center 100 (e.g., advertising billing server 128) may be based on application rates for various recipient interactions and the recipient interaction data stored in the recipient tracking database 106.

In addition, in various embodiments, the video may have a number of frame indicators dispersed throughout the frame sequence of the video that are parsed out of the video by the recipient's video player. The frame indicators may include a response address to which the recipient's end user device 112 is directed to send an electronic response via the network 110. The address in the frame indicators may be in the form of an IP address, a URL, or any other suitable address. The frame indicator may be in the form of a HTML tag that contains the address to which the response is to be sent, as well as information that identifies the recipient to whom the video is sent, and identifying the video into which the frame indicator is inserted. The addresses in the frame indicators may be associated with the data center 100. For example, the address may be an IP address or a URL of the recipient tracking server 126 of the data center 100 or some other network-connected computing device of the data center 100. Each time the recipient receives a frame indicator, the recipient may send the response to the data center 100. That way, in such an embodiment, the data center 100 can track how much of the streaming video was received and played by the recipient 112. This data may be stored in the recipient tracking database 106. For example, the video may comprise a frame indicator in a portion of the video file that follows the commercial portion.

If a response to the post-commercial frame indicator is received by the data center 100, this data is stored in the recipient tracking database 106. The advertiser may be charged a fee, calculated by a computing device of the host center 100 based on the data, if the frame indicator responses indicate that the recipient played the video long enough for the commercial portion of the video to be played.

In addition, as mentioned above, the video, such as the commercial portion, may contain an embedded link and/or the email may contain a link that directs the recipient, when the link is activated, to a web site. The web site may be hosted by a web server 124 of the data center 100 or some other web server. The link may contain the URL or IP address for the web server 124. The web site may provide additional information about the product/service that is the subject of the commercial, such as an extended-length video or other types of information. If the recipient activates the link, data indicative of the linking operation by the recipient may be captured by the recipient tracking server 126 and stored in the recipient tracking database 106. The advertiser may be charged a fee for each time a recipient accesses the web server 124 associated with the link in the video email.

In addition, in various embodiments, if the recipient clicks on another link after accessing the link in the video email, such as a link associated with the advertiser, data indicative of such linking activity by the recipient may be captured by the recipient tracking server 126 and stored in the recipient tracking database 106 and the advertiser may be charged a fee for such additional linking. For example, if the recipient clicks on the commercial in the video, the recipient may be directed to additional information about the product/service offered in the commercial, such as an extended length video, as mentioned above. Following the video or at any other time, the recipient may be presented with a link for the advertiser's web site or some other web site. If the recipient clicks that link, this information is stored in the recipient tracking database 106 and the advertiser may be charged a fee.

Further, if the recipient makes an online purchase of the product/service offered in the video (or a related product/service) after following the links in the video email, data regarding the purchase may be sent to and/or captured by the recipient tracking server 126 and stored in the recipient tracking database 106 and the advertiser may be charged a fee associated with the purchase.

In various embodiments, the playing of the video is paused if the recipient clicks on the commercial to view more information about the advertised product/service, etc., as described above. The playing of the video may be resumed when the recipient returns to the video player and restarts the video using the applicable video controls.

Returning to FIG. 1, at step 26, the recipient may view the upcoming episode preview portion of the video, which may be at the end of the video. The upcoming episode preview portion may preview the contents of a subsequent video or videos in a topical series related to the topic of the video in the email. Preferably, the upcoming episode preview entices the viewer to be amendable to viewing future videos sent via email to the recipient. The recipient preferably will have the option to update their menu to provide quick access and alerts for these new viewing opportunities.

At step 28, the recipient may be presented with an option for subscribing to a video email service, through which video emails pertaining to topics of interest for the recipient will be emailed to the recipient on a going forward basis as long as the recipient does not terminate his/her subscription. Preferably, the subscription to the video email service is free to the recipient. The subscription invitation may be in the email sent to the recipient at step 12. If the recipient chooses to subscribe to the video email service, the recipient may be directed to or otherwise access a web site hosted by the data center 100 at step 30 (such as by the web server 124). Through the interface provided by the web site, the recipient may provide demographic information, including information about topics on which the recipient would like to receive and view video emails, e.g., the recipient's interests and affinities. The data provided by the recipient may be stored in the customer database 104 or some other computer database.

Thereafter, at step 32, additional video emails may be sent to the recipient by the data center 100. The subjects of the videos may pertain to the recipient's identified areas of interest stored in the customer database 104. The video emails may be sent to the recipient periodically or from time to time, such as when new videos become available.

In addition, at step 34, the recipient may access a web site hosted by the web server 124 or some other web server of the data center 100. The URL for the web site may be emailed to the recipient or a link to the web site may be included in the video emails sent to the recipient. The web site may be personalized to the recipient. As such, at the web site the recipient may be provided with a menu of video clips in the recipient's identified area(s) of interest that the recipient can select to view. Each video clip may have a commercial portion as described above. Also at the web site, the recipient may be permitted to select additional areas of interest, such as from a selection menu. If the recipient selects an additional area of interest, the recipient will be presented with options for viewing video clips in the selected area of interest at the web site. Also, the web site may provide a search field that permits the recipient to search for topics not offered in the selection menu.

As described above, the recipient's interaction with the videos viewed from the web site may be tracked with the tracking data stored in the tracking database 106. For example, if the recipient clicks on the commercial portion of the video to access additional information about the advertised product/service, such activity by the recipient may be stored in the database 106. The advertiser may be charged a fee each time a recipient clicks on the commercial in video viewed from the web site. Similarly, if the recipient follows links to a web site, e.g., a web site of the advertiser, and/or purchases the advertised products/service online, this activity may be tracked and stored in the database 106, with the advertiser being charged a fee for each occurrence, for example. The appropriate fee may be calculated by a computer device of the host data center 100 based on data stored in the recipient tracking data bus 106.

In addition, the web site and the recipient's menu may allow the recipient to post or upload his/her own digital video clip files. In various embodiments, the recipient must agree to certain stipulated terms and conditions in order to post video clips. The terms and conditions may permit insertion of commercial portions in the video clips as described above.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by an electronic processor circuit or any other similar electronic computing device. The software code or specialized control hardware/software that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, flash drives, chips, or hard disk drives. A computer-readable medium may also include memory storage that is physical, virtual, permanent, temporary, semipermanent, and/or semitemporary.

Computer systems and computer-based devices, including servers, disclosed herein may include memory for storing certain software modules used in obtaining, processing, and communicating information. A process of the computer system, etc. may execute the software. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. As used herein, "server" includes a server computer, an enterprise server, an application server, and comprises at least one electronic processor circuit (e.g., a microprocessor) and least one memory circuit (e.g., a RAM and/or ROM).

In various embodiments disclosed herein, a single component may be replaced by multiple components and multiple components may be replaced by a single component to perform a given function or functions. For example, any or each of the databases 102-106 may comprise multiple computer databases, such as a federated database system. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability. Also, the components of the data center 100 described above can be co-located in one facility or various components may be located at different locations and networked together.

The computer systems may comprise one or more electronic processors in communication with memory circuits (e.g., RAM or ROM) via data bus. The data bus may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

The various components of the data center 100 (e.g., databases and servers) may be co-located in a central data center or distributed geographically. The components may be interconnected by any suitable data communication network. In addition, the various components of the data center 100 (e.g., databases and servers) may or may not have the same administrative domain.

In various embodiments, the present invention is directed to a computer-based push video system that comprises at least one database and at least one server connected to the at least one database. The at least one server comprises at least one processor, and the at least one server is programmed to, among other things: (i) send data electronically to a recipient at a recipient client device via a data network, wherein the data comprises a video playable by the recipient client device, wherein the video comprises a content portion and an advertisement portion, wherein the content portion of the video pertains to an affinity of the recipient, wherein data regarding the recipient's affinities are stored in the at least one database; and (ii) track interaction by the recipient with the video, wherein recipient interaction data is stored in the at least one database. In various implementations, the data comprises an email. In addition, the video may comprise a start and an end, and the advertisement portion of the video may start after the start of the video and end prior to the end of the video.

The at least one server may be further programmed to compute an advertisement charge for an advisor associated with the advertisement portion of the video based on the recipient interaction data. The recipient interaction data may comprise data indicative of: (i) whether a portion of the video was played by the recipient client device; and (ii) how much of the video was played by the recipient client device. The at least one server may also be programmed to: (i) send emails to a plurality of recipients at respective recipient client devices, each email comprising a video playable by the recipient client devices, the videos comprising a content portion and an advertisement portion; and (ii) track interactions by the plurality of recipients with the videos, wherein recipient interaction data for the plurality of recipients is stored in the at least one database. The at least one database may comprise contact information for the respective recipient client devices. The video may comprise an upcoming episode preview portion. In addition, the advertisement portion of the video may end before the upcoming episode preview portion starts. Further, the advertisement portion of the video may end before the content portion of the video ends, and the content portion of the video may end before the upcoming episode preview portion starts. Additionally, a countdown clock may be shown during the advertisement portion of the video, where the countdown clock shows an amount of remaining time for the advertisement portion. Also, the video may comprise a streaming video playable in a media viewer program of the recipient client device, where the video is streamed from the at least one server. In addition, the video may comprise an embedded hyperlink, and the recipient interaction data comprises data indicative of: (i) whether a portion of the video was played by the recipient client device; (ii) how much of the video was played by the recipient client device; and (iii) whether the recipient activated the embedded hyperlink.

In yet other embodiments, the at least one server is programmed to: (i) send data electronically to a recipient at a recipient client device via a data network, wherein the data comprises a link for a video streamed from the at least one server to the recipient client device and that is playable by the recipient client device, wherein the video comprises a content portion and an advertisement portion, wherein the content portion of the video pertains to an affinity of the recipient, wherein data regarding the recipient's affinities are stored in the at least one database; and (ii) track interaction by the recipient with the video, wherein recipient interaction data is stored in the at least one database. In addition, the at least one server may be further programmed to compute an advertisement charge for an advisor associated with the advertisement portion of the video based on the recipient interaction data.

According to other embodiments, the present invention is directed to a computer-based push video method. The method may comprise the steps of: (i) sending data electronically from at least one server to a recipient at a recipient client device via a data network, wherein the data comprises a video playable by the recipient client device, wherein the video comprises a content portion and an advertisement portion, wherein the content portion of the video pertains to an affinity of the recipient, wherein data regarding the recipient's affinities are stored in at least one database that is in communication with the at least one server, and wherein the at least one server comprises a processor; and (ii) tracking by the at least one server interaction by the recipient with the video, wherein recipient interaction data is stored in the at least one database. The method may further comprise the step of computing by the at least one server an advertisement charge for an advisor associated with the advertisement portion of the video based on the recipient interaction data. The step of sending the data may comprise sending the data from the at least one server to a plurality of recipients at respective recipient client devices, each email a video playable by the recipient client devices, the videos comprising a content portion and an advertisement portion. The step of tracking interactions may comprise tracking by the at least one server interactions by the plurality of recipients with the videos, wherein recipient interaction data for the plurality of recipients is stored in the at least one database.

In yet another embodiment, the computer-based push video method comprises the steps of: (i) sending data electronically from at least one server to a recipient at a recipient client device via a data network, wherein the data comprises a link for a video streamed from the at least one server to the recipient client device and that is playable by the recipient client device, wherein the video comprises a content portion and an advertisement portion, wherein the content portion of the video pertains to an affinity of the recipient, wherein data regarding the recipient's affinities are stored in at least one database that is in communication with the at least one server, and wherein the at least one server comprises a processor; and (ii) tracking by the at least one server interaction by the recipient with the video, wherein recipient interaction data is stored in the at least one database. The method may further comprise the step of computing by the at least one server an advertisement charge for an advisor associated with the advertisement portion of the video based on the recipient interaction data. The step of sending the data may comprise sending emails from the at least one server to a plurality of recipients at respective recipient client devices, each data comprising a link for a video streamed from the at least one server to the respective recipient client devices and that is playable by the respective recipient client devices, the videos comprising a content portion and an advertisement portion. The step of tracking interactions may comprise tracking by the at least one server interactions by the plurality of recipients with the videos, wherein recipient interaction data for the plurality of recipients is stored in the at least one database.

While various embodiments have been described herein, it should be apparent that various modifications, alterations, and adaptations to those embodiments may occur to persons skilled in the art with attainment of at least some of the advantages. The disclosed embodiments are, therefore, intended to include all such modifications, alterations, and adaptations without departing from the scope of the embodiments as set forth herein.

What is claimed is:

1. A computer-based push video system comprising:
   at least one database; and
   at least one server connected to the at least one database, wherein the at least one server comprises at least one processor, and wherein the at least one server is programmed to:
      determine at least one recipient to send electronically a video with an advertisement, based on a relationship between a subject matter of the video and affinity data for the at least one recipient stored in the at least one database, wherein the affinity data relates to one or more topics of interest to the at least one recipient;
      transmit an email to the at least one recipient associated with a recipient client device via a data network, wherein the video is playable from the email by the recipient client device, wherein the video includes a start and an end, and comprises a content portion and an advertisement portion, wherein the content portion of the video pertains to an affinity of the at least one recipient, and wherein the advertisement portion of the video starts after the start of the video and wherein the advertisement portion of the video ends prior to the end of the video;
      gather recipient interaction data for the at least one recipient by tracking interaction by the at least one recipient with the video, wherein the recipient interaction data is stored in the at least one database, and wherein the recipient interaction data comprises data indicative of:
         whether the email was opened by the at least one recipient;
         whether a portion of the video was played by the recipient client device;
         how much of the video was played by the recipient client device, including whether a portion of the advertisement portion was played; and
         whether the at least one recipient accessed a hyperlink in the video associated with the advertisement portion of the video; and
      compute an advertisement fee to charge an advertiser associated with the advertisement portion of the video based on the recipient interaction data, wherein the advertisement fee is computed based on at least whether the email was opened by the at least one recipient, whether a portion of the video was played by the recipient client device, how much of the video was played by the recipient client device, including whether a portion of the advertisement portion was played, and whether the at least one recipient accessed the hyperlink in the video associated with the advertisement portion of the video.

2. The push video system of claim 1, wherein the at least one server is programmed to:
   send emails to a plurality of recipients associated with respective recipient client devices, each email comprising the video playable by the recipient client devices, the videos comprising the content portion and the advertisement portion;
   gather recipient interaction data for the plurality of recipients by tracking interactions by the plurality of recipients with the videos, wherein the recipient interaction data for the plurality of recipients is stored in the at least one database; and
   compute advertisement fees to charge the advertiser associated with the advertisement portion of the video based on the recipient interaction data from each of the recipients.

3. The push video system of claim 2, wherein the at least one database comprises contact information for the respective recipient client devices.

4. The push video system of claim 3, wherein the video further comprises an upcoming episode preview portion.

5. The push video system of claim 4, wherein the advertisement portion of the video ends before the upcoming episode preview portion starts.

6. The push video system of claim 5, wherein:
   the advertisement portion of the video ends before the content portion of the video ends; and
   the content portion of the video ends before the upcoming episode preview portion starts.

7. The push video system of claim 6, further comprising a countdown clock that is shown during the advertisement portion of the video, the countdown clock showing an amount of remaining time for the advertisement portion.

8. The push video system of claim 1, wherein the video comprises a streaming video playable in a media viewer program of the recipient client device, wherein the video is streamed from the at least one server.

9. A computer-based push video method comprising:
   determining, by at least one server, at least one recipient to send electronically a video with an advertisement, based on a relationship between a subject matter of the video and affinity data for the at least one recipient stored in at least one database, wherein the affinity data relates to one or more topics of interest to the at least one recipient;
   transmitting an email by the least one server to the at least one recipient associated with a recipient client device via a data network, wherein the video is playable from the email by the recipient client device, wherein the video includes a start and an end, and comprises a content portion and an advertisement portion, wherein the content portion of the video pertains to an affinity of the at least one recipient based on the affinity data regarding the recipient's affinities stored in the at least one database that is in communication with the at least one server, and wherein the advertisement portion of the video starts after the start of the video and wherein the advertisement portion of the video ends prior to the end of the video, and wherein the at least one server comprises a processor;

gathering recipient interaction data for the at least one recipient by tracking by the at least one server interaction by the at least one recipient with the video, wherein the recipient interaction data is stored in the at least one database, and wherein the recipient interaction data comprises data indicative of:

whether the email was opened by the at least one recipient;

whether a portion of the video was played by the recipient client device;

how much of the video was played by the recipient client device, including whether a portion of the advertisement portion was played; and whether the at least one recipient accessed a hyperlink in the video associated with the advertisement portion of the video; and computing an advertisement fee to charge an advertiser associated with the advertisement portion of the video based on the recipient interaction data, wherein the advertisement fee is computed based on at least whether the email was opened by the at least one recipient, whether a portion of the video was played by the recipient client device, how much of the video was played by the recipient client device, including whether a portion of the advertisement portion was played, and whether the at least one recipient accessed the hyperlink in the video associated with the advertisement portion of the video.

10. The push video system of claim 1, further comprising:
upon activation of the hyperlink in the video, the video playing for the at least one recipient is paused and the recipient client device opens in a browser a web site associated with the hyperlink;

the web site allows the at least one recipient to purchase items online; and the at least one server is further programmed to compute a fee for the advertiser based on a purchase of an item from the web site by the at least one recipient.

11. The push video method of claim 9, further comprising:
upon activation of the hyperlink in the video, the video playing for the at least one recipient is paused and the recipient client device opens in a browser a web site associated with the hyperlink;

the web site allows the recipient to purchase items online; and the method further comprises computing by the at least one server a fee for the advertiser based on a purchase of an item from the web site by the at least one recipient.

12. The push video system of claim 1, wherein the email comprises a link that, upon activation, plays the video.

13. The push video method of claim 9, wherein the email comprises a link that, upon activation, plays the video.

\* \* \* \* \*